(12) United States Patent
Gatten

(10) Patent No.: US 9,699,973 B2
(45) Date of Patent: Jul. 11, 2017

(54) PNEUMATICALLY POWERED POLE SAW

(71) Applicant: Ronald Alan Gatten, Pleasanton, CA (US)

(72) Inventor: Ronald Alan Gatten, Pleasanton, CA (US)

( * ) Notice: Subject to any disclaimer, the term of this patent is extended or adjusted under 35 U.S.C. 154(b) by 0 days.

(21) Appl. No.: 14/394,738

(22) PCT Filed: Apr. 15, 2013

(86) PCT No.: PCT/US2013/036564
§ 371 (c)(1),
(2) Date: Oct. 15, 2014

(87) PCT Pub. No.: WO2013/158534
PCT Pub. Date: Oct. 24, 2013

(65) Prior Publication Data
US 2015/0047211 A1    Feb. 19, 2015

Related U.S. Application Data

(60) Provisional application No. 61/810,440, filed on Apr. 10, 2013.

(51) Int. Cl.
*A01G 3/08*    (2006.01)
*B23D 51/18*    (2006.01)

(52) U.S. Cl.
CPC ............. *A01G 3/085* (2013.01); *B23D 51/18* (2013.01)

(58) Field of Classification Search
CPC ........ A01G 3/085; B23D 51/18; F16K 31/122
USPC ................... 30/166.3, 272.1; 83/746, 748
See application file for complete search history.

(56) References Cited

U.S. PATENT DOCUMENTS

| | | | | |
|---|---|---|---|---|
| 1,347,444 A | * | 7/1920 | Christiansen | F01B 17/00 173/152 |
| 1,556,061 A | * | 10/1925 | Ball | B27B 11/00 83/756 |
| 1,704,641 A | | 3/1929 | Weed | |
| 2,097,692 A | * | 11/1937 | Fiegel | B21D 53/10 29/898.054 |

(Continued)

FOREIGN PATENT DOCUMENTS

| | | |
|---|---|---|
| CN | 201905066 U | 7/2011 |
| RU | 2046698 C1 | 10/1995 |

(Continued)

OTHER PUBLICATIONS

Print out from http://www.mytoolstore/astro.astmat02.html dated Oct. 8, 2007 (4 pages).

(Continued)

*Primary Examiner* — Sean Michalski
(74) *Attorney, Agent, or Firm* — Cantor Colburn LLP

(57) ABSTRACT

A pneumatically powered pole saw is provided, the pole saw having gas actuated main valves configured for movement between first positions and second positions wherein the gas actuated main valves are located in a main valves assembly fluidly coupled to the piston chamber; and a first pilot valve is configured to send actuating gas through a conduit to the main valves assembly and a second pilot valve is configured to send actuating gas through a conduit to the main valves assembly wherein the cutting blade moves in opposite directions in response to the actuating gas of the first and second pilot valves.

14 Claims, 15 Drawing Sheets

(56) References Cited

U.S. PATENT DOCUMENTS

| | | |
|---|---|---|
| 2,735,458 A | 2/1956 | Buchmann |
| 3,149,537 A * | 9/1964 | Fink .................... F15B 15/1409 |
| | | 137/625.69 |
| 3,155,011 A | 11/1964 | Hyskell |
| 3,241,459 A | 3/1966 | Pirrello |
| 3,352,143 A * | 11/1967 | Bollar ........................ B21J 7/24 |
| | | 173/152 |
| 3,610,285 A | 10/1971 | Passaggio |
| 3,872,934 A | 3/1975 | Terada |
| 3,931,953 A * | 1/1976 | Allen .................... F16K 31/122 |
| | | 251/175 |
| 4,429,752 A * | 2/1984 | Bailey ................. B25D 17/265 |
| | | 173/105 |
| 4,593,712 A | 6/1986 | Quartana, III |
| 4,632,163 A | 12/1986 | Fandrich |
| 4,662,551 A | 5/1987 | Dudley et al. |
| 4,675,944 A | 6/1987 | Wells |
| 4,683,914 A | 8/1987 | Brisland |
| 4,691,439 A | 9/1987 | Marra |
| 4,838,034 A | 6/1989 | Leonard et al. |
| 4,977,674 A | 12/1990 | van der Merwe et al. |
| 5,020,712 A | 6/1991 | Monacelli |
| 5,036,845 A | 8/1991 | Scholley |
| 5,084,975 A | 2/1992 | Melter |
| 5,086,848 A * | 2/1992 | Hudak .................... E21B 4/145 |
| | | 173/1 |
| 5,127,399 A | 7/1992 | Scholley |
| 5,134,776 A | 8/1992 | Moody |
| 5,218,767 A | 6/1993 | Wells |
| 5,243,761 A | 9/1993 | Sullivan et al. |
| 5,253,554 A | 10/1993 | Riera et al. |
| 5,511,313 A | 4/1996 | Yoder et al. |
| 6,065,216 A | 5/2000 | Izumisawa |
| 6,065,373 A | 5/2000 | Watanabe et al. |
| 6,149,356 A | 11/2000 | Chu et al. |
| 6,173,938 B1 * | 1/2001 | McAndrew ........... F15B 15/223 |
| | | 251/31 |
| 6,183,217 B1 | 2/2001 | Elliott et al. |
| 6,268,077 B1 | 7/2001 | Kelley et al. |
| 6,321,854 B1 | 11/2001 | Bisutti |
| 6,357,439 B1 | 3/2002 | Cook et al. |
| 6,415,876 B1 | 7/2002 | Bollinger et al. |
| 6,488,050 B1 | 12/2002 | Jabcon |
| 6,658,745 B1 | 12/2003 | Huang |
| 6,932,128 B2 | 8/2005 | Turan, Jr. |
| 7,051,995 B2 * | 5/2006 | Tornqvist ................. B25D 9/20 |
| | | 173/17 |
| 7,207,116 B2 | 4/2007 | Nakamura |
| 7,490,625 B1 * | 2/2009 | Johnson ............... G01M 3/3236 |
| | | 137/596.16 |
| 7,793,912 B2 * | 9/2010 | Andoh .................... F16K 11/07 |
| | | 137/625.6 |
| 7,992,652 B2 * | 8/2011 | Plunkett .................... E21B 4/14 |
| | | 173/13 |
| 8,528,649 B2 * | 9/2013 | Kolle ...................... E21B 21/10 |
| | | 166/321 |
| 8,640,787 B2 * | 2/2014 | Rohrer ...................... E02D 7/10 |
| | | 173/114 |
| 8,714,515 B2 * | 5/2014 | Nannan ..................... F15B 9/03 |
| | | 137/553 |
| 9,194,509 B2 * | 11/2015 | Adams .................. F16K 31/122 |
| 2002/0112356 A1 | 8/2002 | Bollinger et al. |
| 2004/0117993 A1 | 6/2004 | Armstrong |
| 2005/0109521 A1 * | 5/2005 | Tornqvist ................. B25D 9/20 |
| | | 173/206 |
| 2006/0255085 A1 | 11/2006 | Wen |
| 2006/0261121 A1 | 11/2006 | Uchiyama et al. |
| 2007/0289760 A1 * | 12/2007 | Sterling .................... B23C 3/00 |
| | | 173/104 |
| 2008/0154479 A1 | 6/2008 | Graham |
| 2009/0107690 A1 * | 4/2009 | Shibuya ................ B24B 23/043 |
| | | 173/14 |
| 2012/0240418 A1 * | 9/2012 | Gatten ................... B23D 51/18 |
| | | 30/371 |

FOREIGN PATENT DOCUMENTS

| | | |
|---|---|---|
| SU | 185485 A1 | 10/1966 |
| SU | 501868 A1 | 3/1976 |

OTHER PUBLICATIONS

Print out from http://www.mytoolstore/fullstory/23359 dated Oct. 8, 2007 (3 pages).

International Search Report dated May 11, 2009 for International Application No. PCT/US2008/082551, International Filing Date Nov. 6, 2008.

Written Opinion dated May 11, 2009 for International Application No. PCT/US2008/082551, International Filing Date Nov. 6, 2008.

International Search Report dated Sep. 5, 2013 for International Application No. PCT/US2013/036564, International Filing Date Apr. 15, 2013.

Written Opinion dated Sep. 5, 2013 for International Application No. PCT/US2013/036564, International Filing Date Apr. 15, 2013.

* cited by examiner

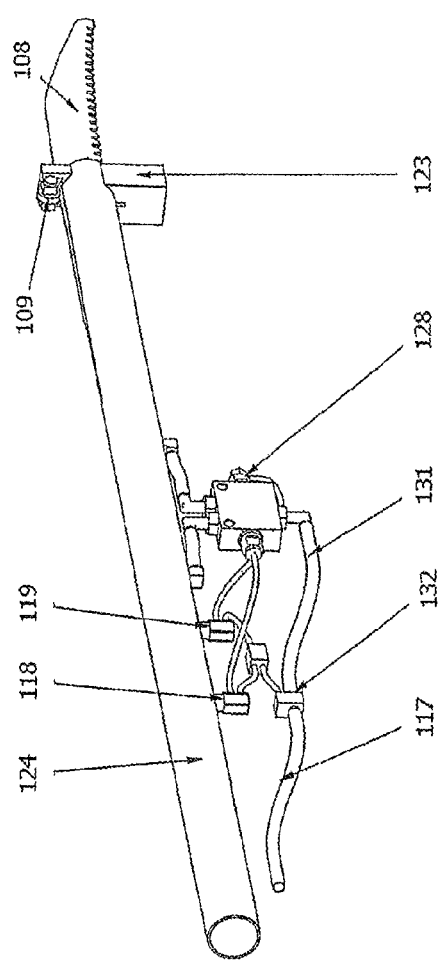
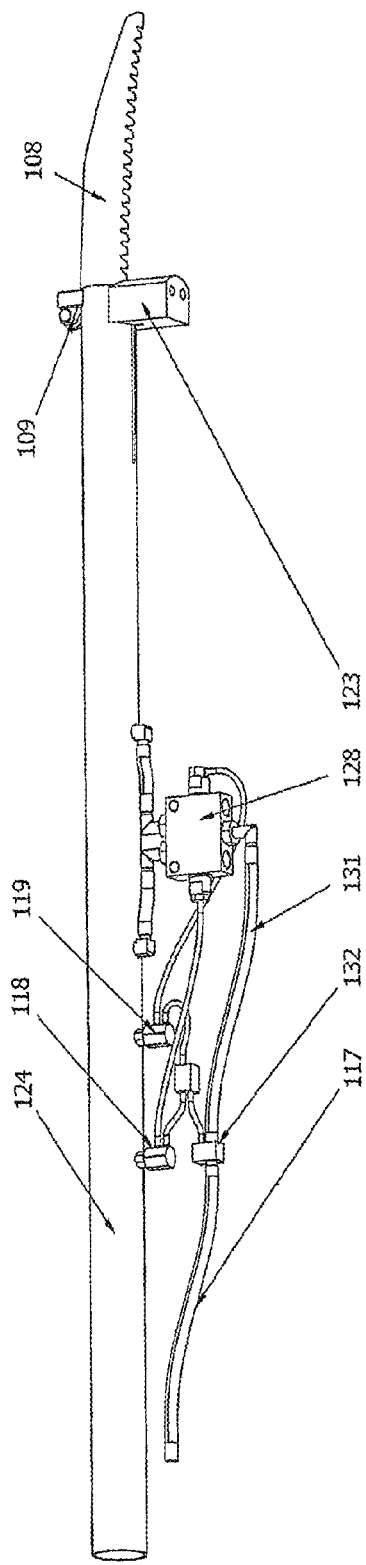
FIG. 2A
FIG. 2B

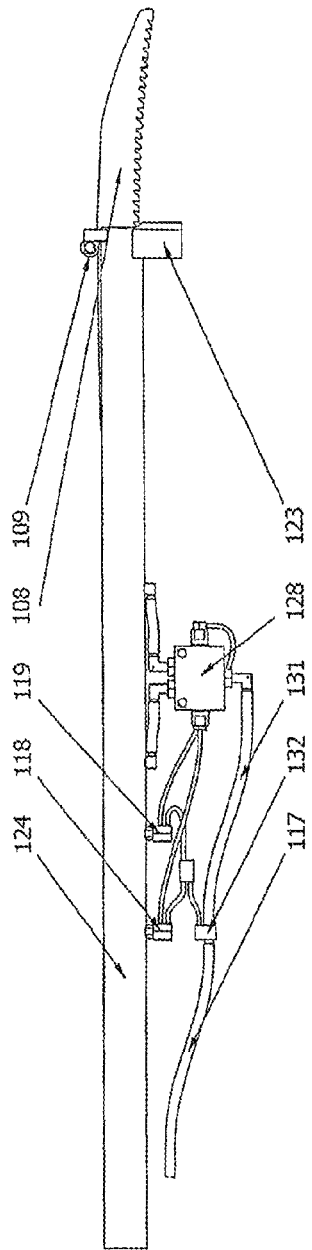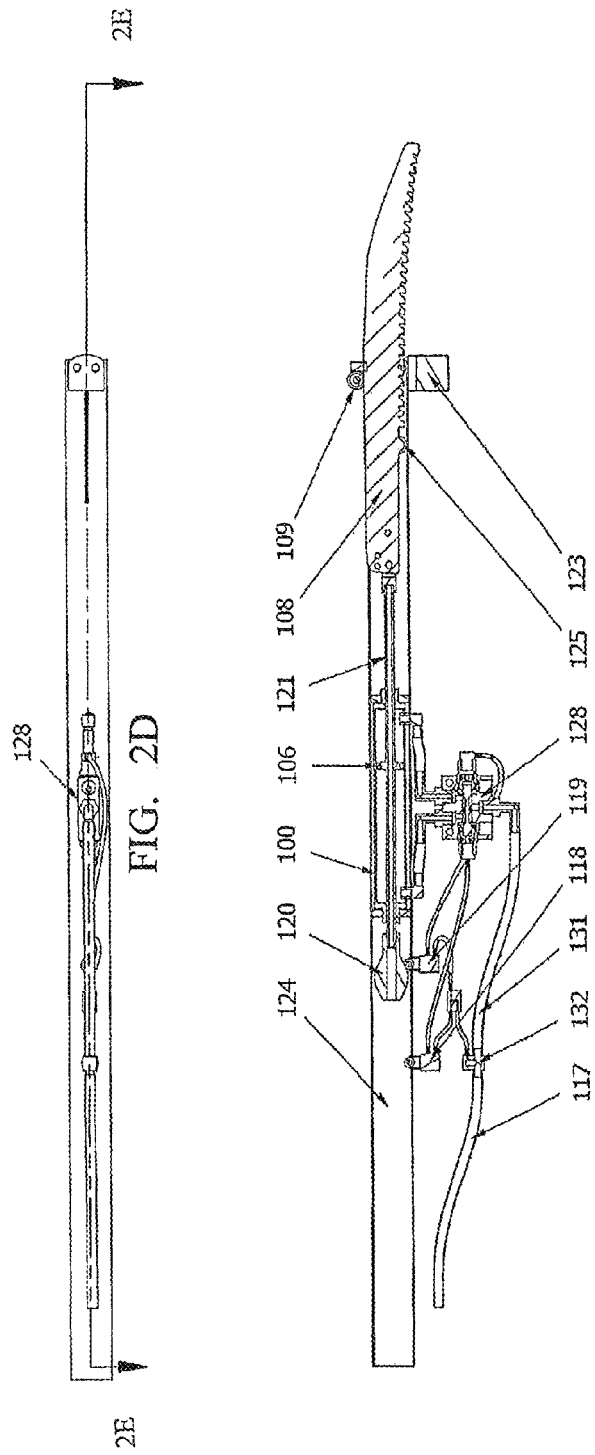

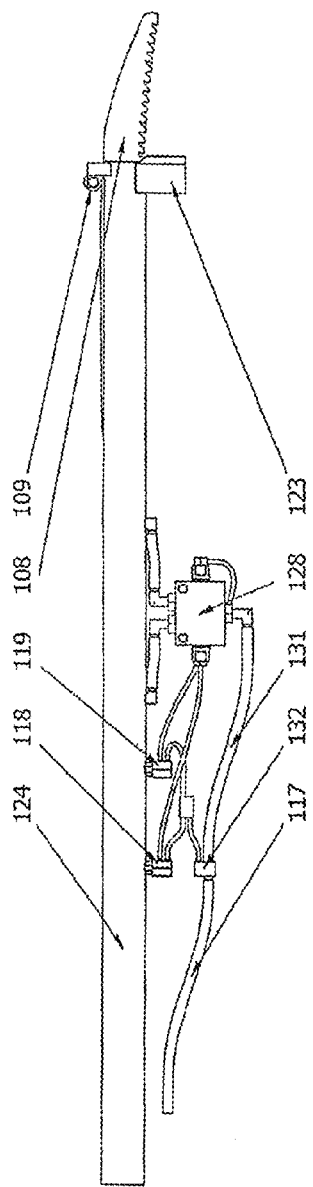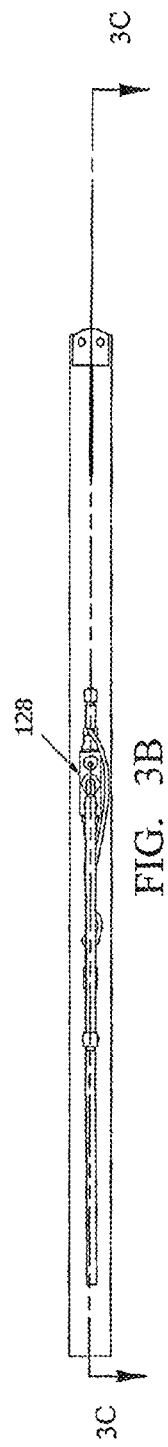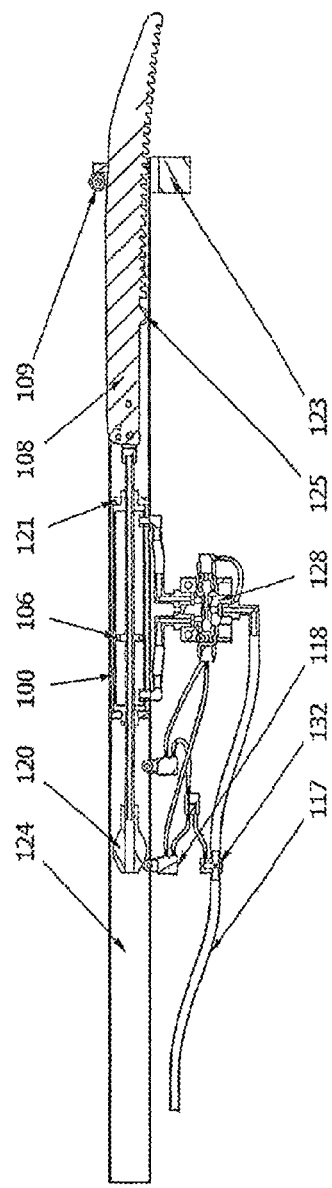

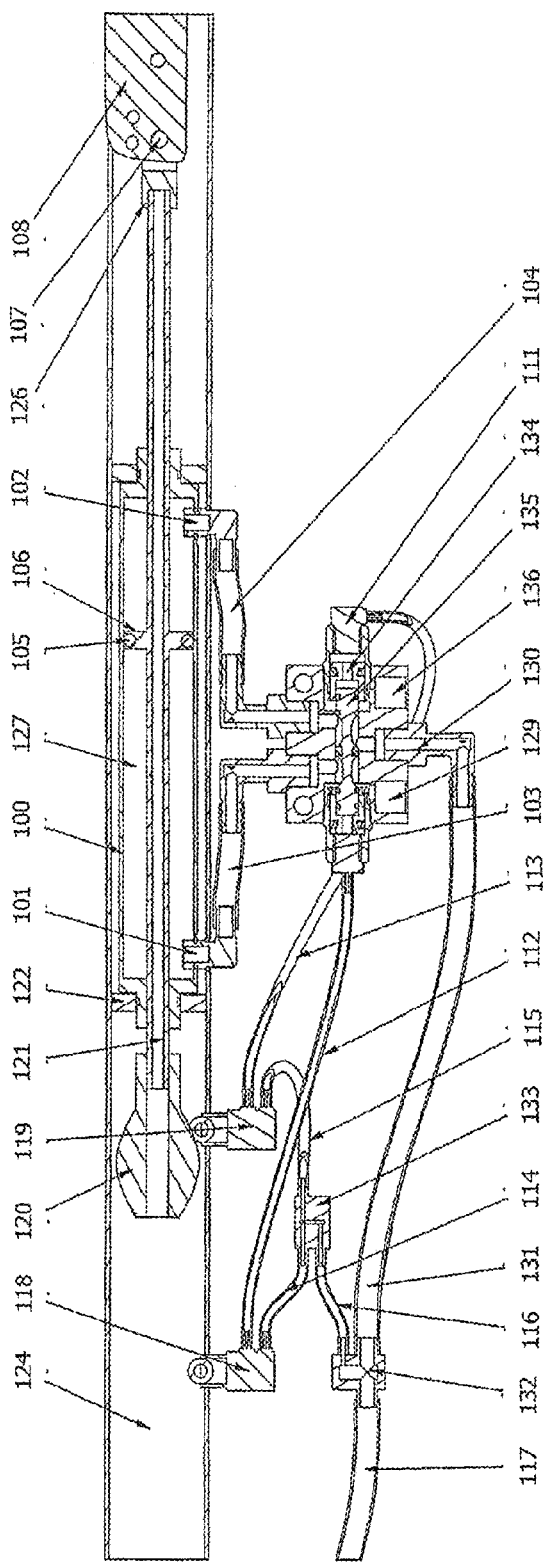
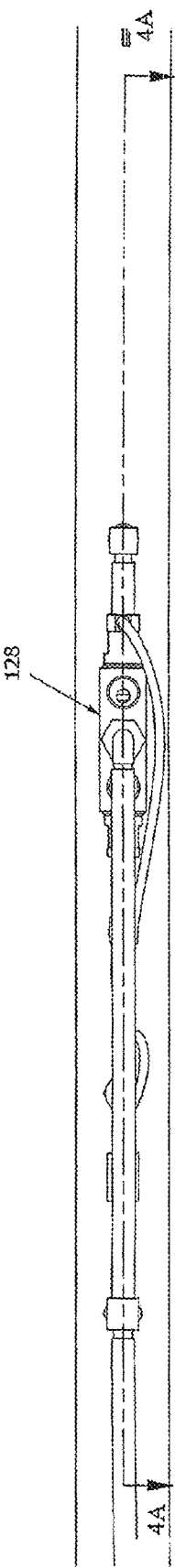
FIG. 4A
FIG. 4B

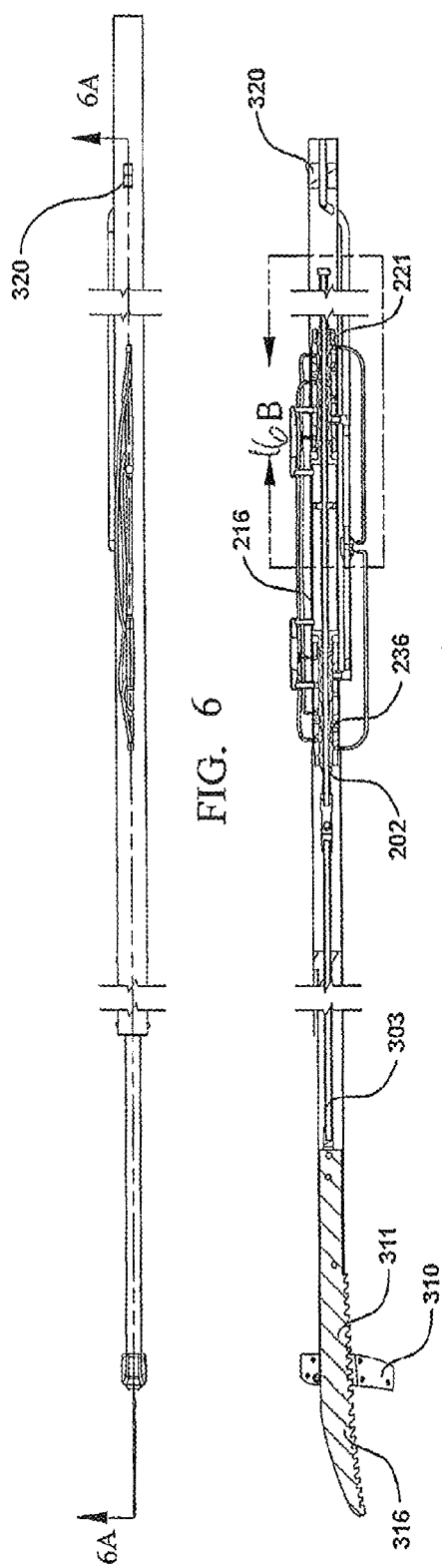
FIG. 6
FIG. 6A
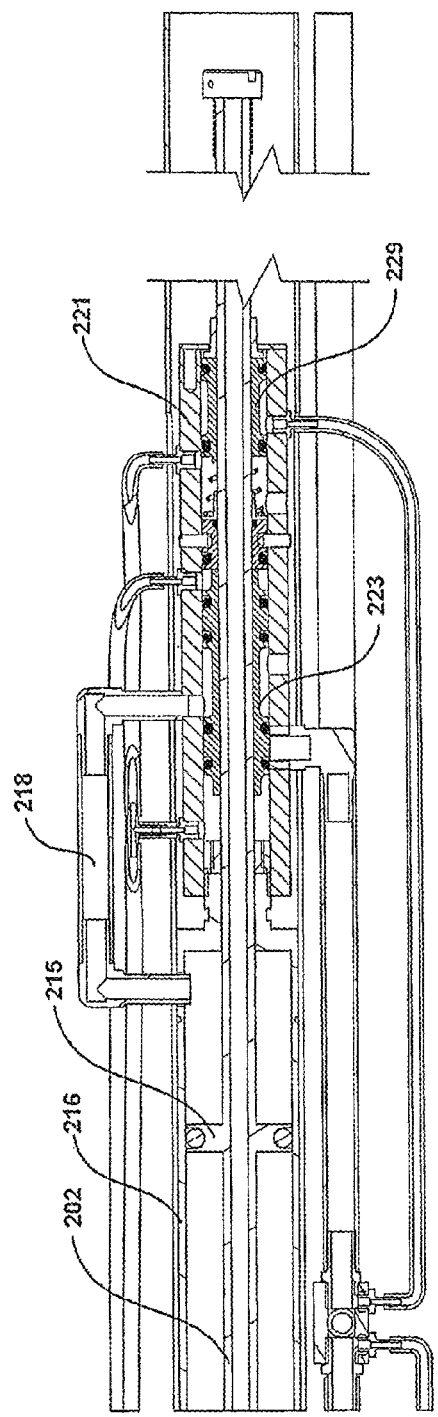
FIG. 6B

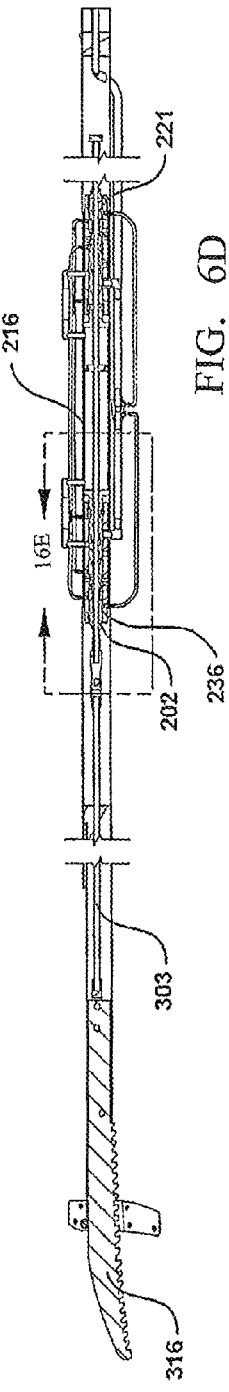
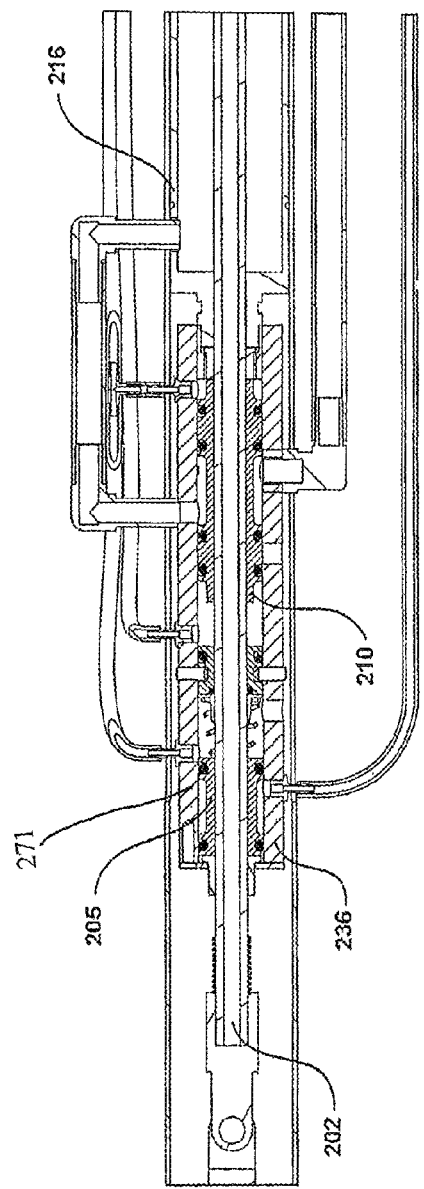
FIG. 6C
FIG. 6D
FIG. 6E

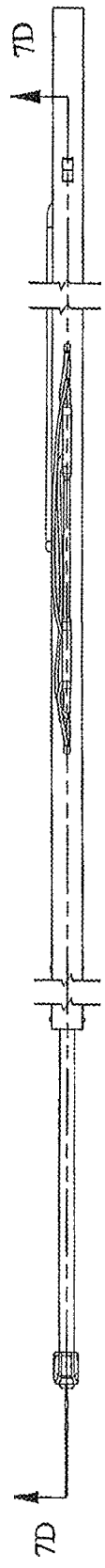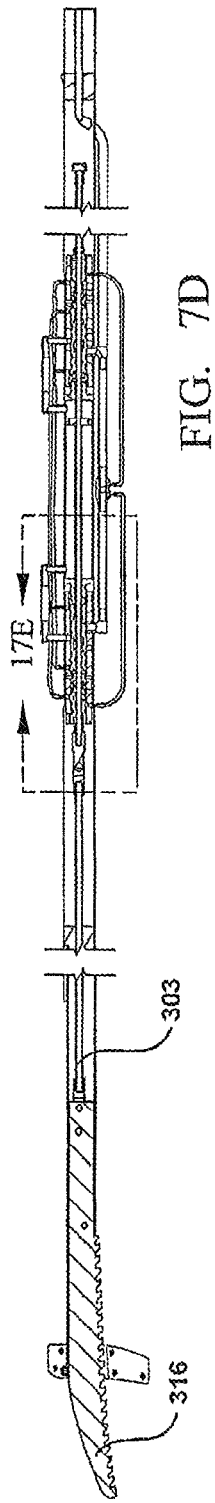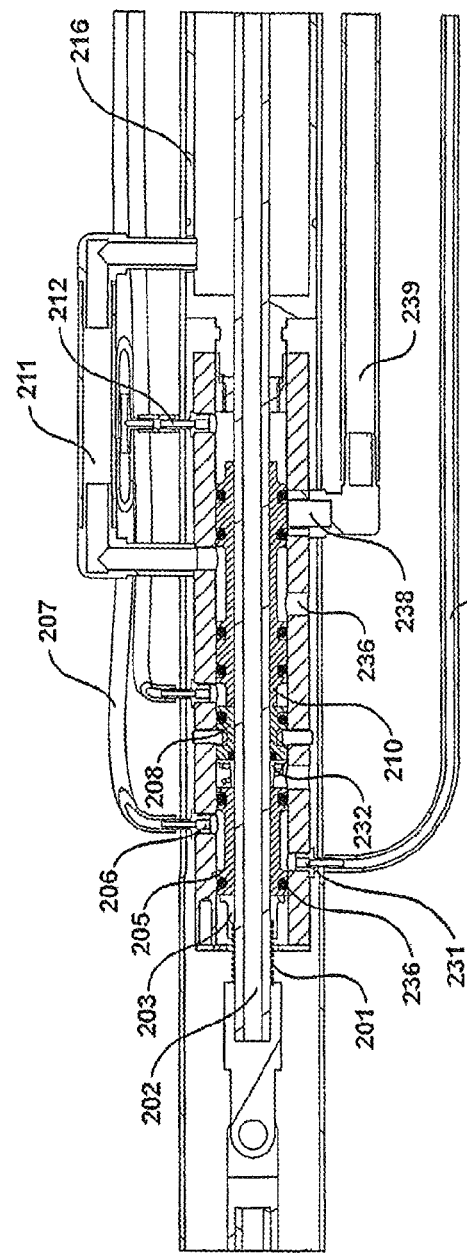
FIG. 7C
FIG. 7D
FIG. 7E

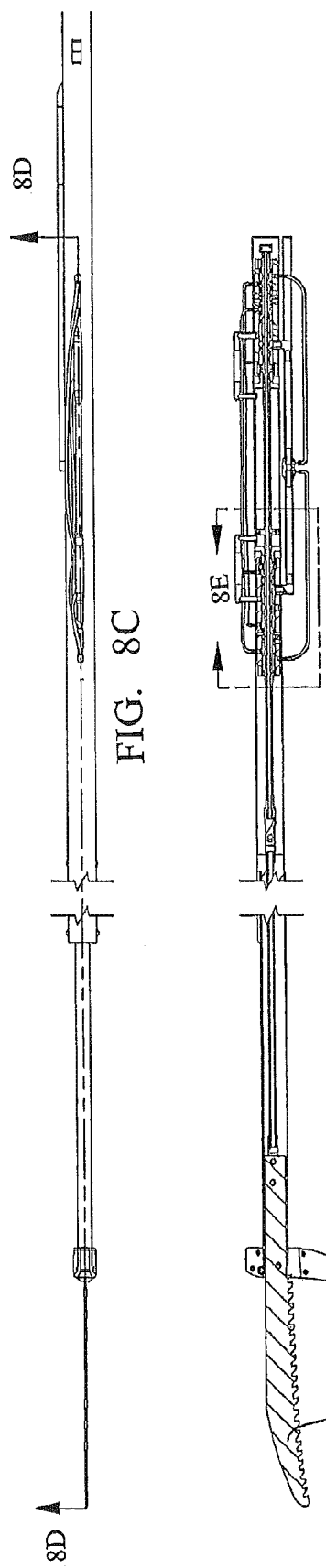
FIG. 8C
FIG. 8D
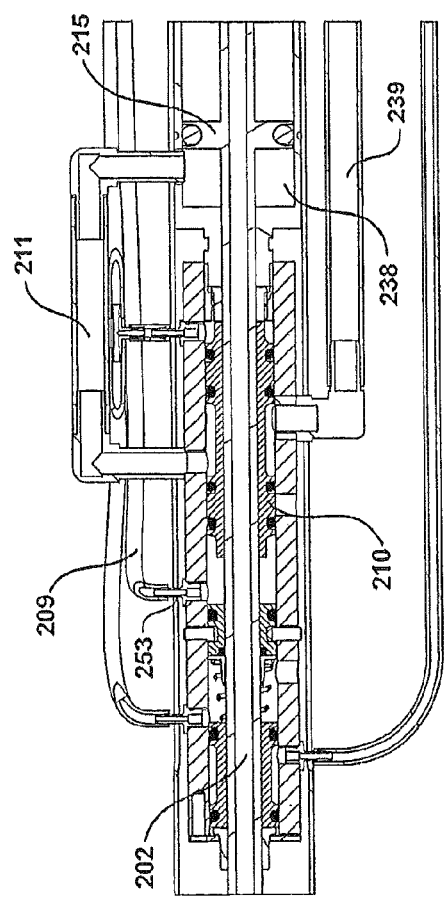
FIG. 8E

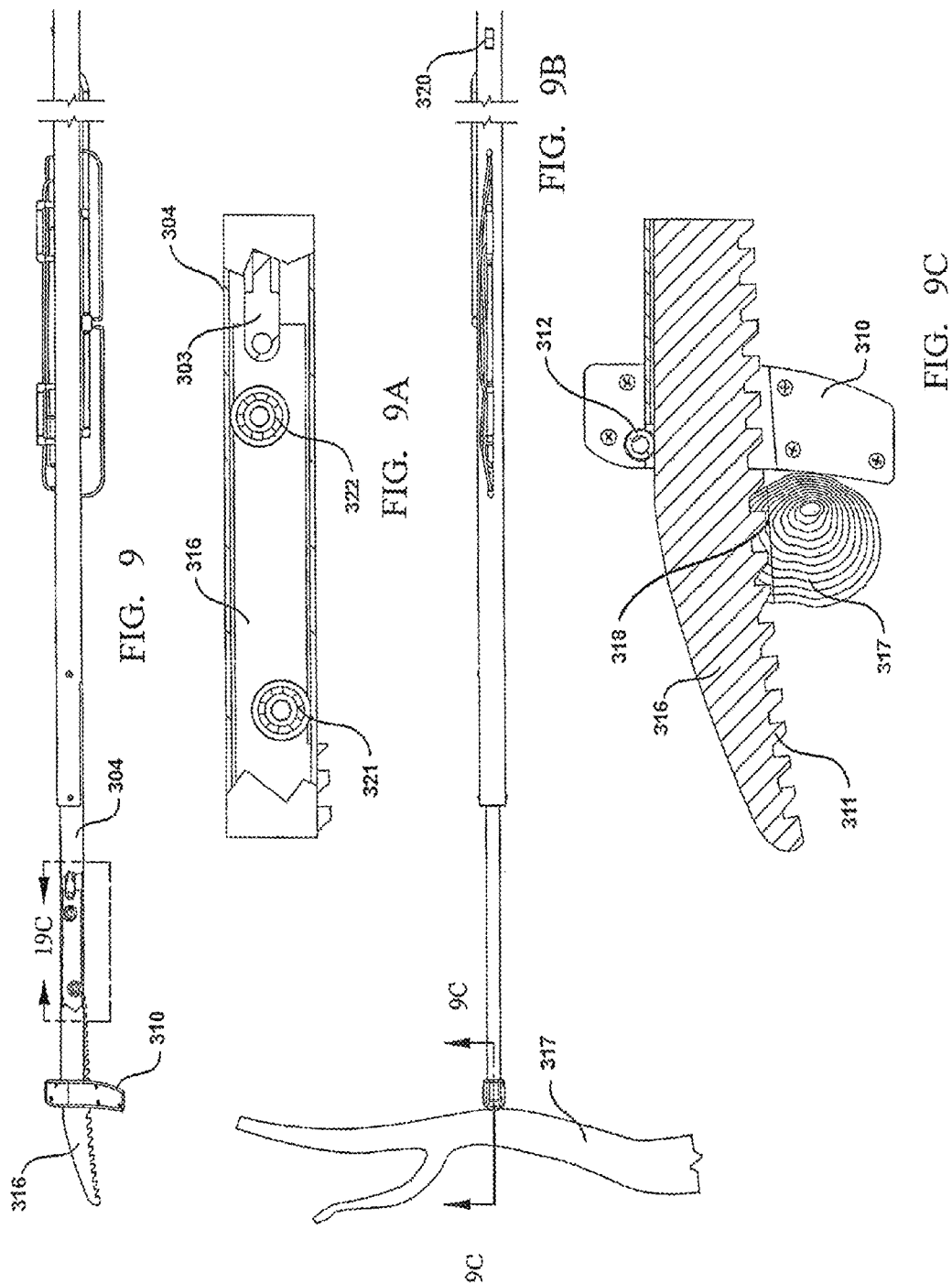

PNEUMATICALLY POWERED POLE SAW

CROSS REFERENCE TO RELATED APPLICATIONS

This application is a National Phase Application of Patent Application PCT/US2013/036564 filed on Apr. 15, 2013, which claims priority to U.S. patent application Ser. No. 13/448,340, filed Apr. 16, 2012 and U.S. Provisional Patent Application Ser. No. 61/810,440, filed Apr. 10, 2013, the contents each of which are incorporated herein by reference thereto.

BACKGROUND

Various embodiments of the present invention relate to a pneumatically powered pole saw.

Manually operated pole saws require an operator to manually push and pull a long pole back and forth in order to move a saw blade attached to the end of the pole, thereby cutting tree limbs with the attached saw blade. These pole saws rely entirely upon the operator force the necessary forces to be applied to the cutting blade or saw blade of the pole saw. Accordingly, and as the operator tires the efficiency of the cutting operation is reduced.

Accordingly, it is desirable to provide a powered pole saw having a means for efficiently converting stored energy into kinetic energy wherein the saw blade of the pole saw is actuated.

Pilot valves are commonly used to provide fluid flow to actuate larger flow valves which can control higher flow rates. The fluid being controlled is most often compressed gas or hydraulic fluid.

While existing valves are suitable for their intended purpose, the need for improvement remains, particularly in providing a pilot control valve that may utilize the structural features of a common piston cylinder to support and actuate the valve.

SUMMARY OF THE INVENTION

In an embodiment, a pneumatically powered pole saw is provided, the pole saw having: a pole; a cutting blade movably mounted to the pole; a piston slidably received within a piston chamber of the pole; a piston rod coupling to the cutting blade to the piston; gas actuated main valves configured for movement between first positions and second positions wherein the gas actuated main valves are located in a main valves assembly fluidly coupled to the piston chamber; a first pilot valve configured to send actuating gas through a conduit to the main valves assembly, the actuating gas of the first pilot valve actuating the gas actuated valves of the main valves assembly to the first position, wherein movement of the main valves to the first position releases a portion of a source of gas into the piston chamber on one side of the piston while venting the opposite side of the piston chamber, and when the main valves assembly is in the first position the cutting blade to moves in a first cutting direction towards a limit of travel in the first cutting direction; a second pilot valve configured to send actuating gas through a conduit to the main valves assembly when the limit of travel in the first cutting direction has been reached, the actuating gas of the second pilot valve causes the main valves to be moved to the second position, wherein movement of the main valves to the second position releases another portion of compressed gas into the piston chamber on the opposite side of the piston chamber and venting the one side of the piston chamber, wherein the cutting blade moves in an opposite second cutting direction with respect to the first cutting direction until a limit of travel in the second cutting direction is reached wherein the first pilot valve is again actuated and the cutting blade moves again in the first cutting direction until the limit of travel in the first cutting direction is reached.

In yet another embodiment, a pneumatically powered pole saw is provided, the pneumatically powered pole saw having: a pole; a cutting blade movably mounted to the pole; a piston slidably received within a piston chamber of the pole; a piston rod coupling to the cutting blade to the piston; gas actuated main valves configured for movement between first positions and second positions wherein the gas actuated main valves are located in a main valves assembly fluidly coupled to the piston chamber; a first pilot valve configured to send actuating gas through a conduit to the main valves assembly, the actuating gas of the first pilot valve actuating the gas actuated valves of the main valves assembly to the first position, wherein movement of the main valves to the first position releases a portion of a source of gas into the piston chamber on one side of the piston while venting the opposite side of the piston chamber, and when the main valves assembly is in the first position the cutting blade to moves in a first cutting direction towards a limit of travel in the first cutting direction; and a second pilot valve configured to send actuating gas through a conduit to the main valves assembly when the limit of travel in the first cutting direction has been reached, the actuating gas of the second pilot valve causes the main valves to be moved to the second position, wherein movement of the main valves to the second position releases another portion of compressed gas into the piston chamber on the opposite side of the piston chamber and venting the one side of the piston chamber, wherein the cutting blade moves in an opposite second cutting direction with respect to the first cutting direction until a limit of travel in the second cutting direction is reached wherein the first pilot valve is again actuated and the cutting blade moves again in the first cutting direction until the limit of travel in the first cutting direction is reached.

In another embodiment, a pneumatic valve assembly is provided, the pneumatic valve assembly having: a piston slidably received within a piston chamber a piston rod coupled to the piston; gas actuated main valves configured for movement between first positions and second positions wherein the gas actuated main valves are located in a main valves assembly fluidly coupled to the piston chamber; a first pilot valve configured to send actuating gas through a conduit to the main valves assembly, the actuating gas of the first pilot valve actuating the gas actuated valves of the main valves assembly to the first position, wherein movement of the main valves to the first position releases a portion of a source of gas into the piston chamber on one side of the piston while venting the opposite side of the piston chamber, and when the main valves assembly is in the first position the piston rod moves in a first direction towards a limit of travel in the first direction; a second pilot valve configured to send actuating gas through a conduit to the main valves assembly when the limit of travel in the first direction has been reached, the actuating gas of the second pilot valve causes the main valves to be moved to the second position, wherein movement of the main valves to the second position releases another portion of compressed gas into the piston chamber on the opposite side of the piston chamber and venting the one side of the piston chamber, wherein the piston rod moves in an opposite second direction with respect to the first direction until a limit of travel in the second direction is reached wherein the first pilot valve is again actuated and the piston rod moves again in the first direction until the limit of travel in the first direction is reached; and wherein the main valves assembly, the first pilot valve and the second pilot valve are each configured to slidably receive the piston rod therein.

In yet another embodiment, a method for pneumatically powering a pole saw is provided, the method including the steps of: slidably mounting a piston in a piston chamber for movement between a first position and a second position; and moving a reciprocating valve fluidly coupled to the piston chamber, wherein the reciprocating valve is configured for movement between a first position and a second position wherein the reciprocating valve releases a portion of a source of compressed gas into the piston chamber on one side of the piston when the reciprocating valve is in the first position causing the piston to move in a first direction towards a limit of travel in the first direction and a first check valve provides fluid communication to the piston chamber on another side of the piston causing the reciprocating valve to move from the first position towards the second position, when the piston reaches the limit of travel in the first direction, the reciprocating valve releases another portion of the source of compressed gas into the piston chamber on the another side of the piston when the reciprocating valve is in the second position causing the piston to move in a second direction opposite to the first cutting direction and towards a limit of travel in the second direction and a second check valve provides fluid communication to the piston chamber on the one side of the piston, the reciprocating valve moving from the second position towards the first position when the piston reaches a limit of travel in the second direction, wherein movement of the piston between the limits of travel in the first and second directions causes the reciprocating valve to move between the first position and the second position.

In still another embodiment, a compressed gas switching pneumatic valve assembly is provided, the valve assembly having: an outer pneumatic chamber; and a slidably received gas sealed valve member within the outer pneumatic chamber, wherein an internal void extends from one side of the outer pneumatic chamber to another side of the outer pneumatic chamber, the internal void being configured to allow axial location of an pneumatic valve assembly around an axially located piston rod of a pneumatic piston chamber, the pneumatic valve assembly further comprising at least fluid paths to provide switchable fluid flow into and out of the outer pneumatic chamber when the slidably received valve member is externally actuated to change a position within the outer pneumatic chamber.

According to one embodiment of the invention, a valve assembly is provided including a generally hollow cylinder coupled to an axially aligned piston chamber. The cylinder defines an internal void extending from one side of the cylinder to another side of the cylinder. The cylinder includes at least one fluid inlet path and at least one fluid outlet path. A shuttle is arranged within the internal void of the cylinder. The shuttle is slidable between a first position and a second position around an axially located piston rod of the piston chamber. A generally sealed chamber exists between a portion of the shuttle and the cylinder. When the shuttle is in the second position, the chamber fluidly couples the fluid inlet path and the fluid outlet path to provide a controllable fluid flow into and out of the cylinder.

The above-described and other features are appreciated and understood by those skilled in the art from the following detailed description, drawings, and appended claims.

DESCRIPTION OF THE DRAWINGS

FIGS. 2A-9C illustrate various view of exemplary embodiments of the present invention;

DETAILED DESCRIPTION OF EXEMPLARY EMBODIMENTS

In accordance with exemplary embodiments of the present invention, a pneumatically powered pole saw, a method for operating the pole saw, a pilot valve and a pilot valve for use with a pole saw is disclosed.

Figure 1:
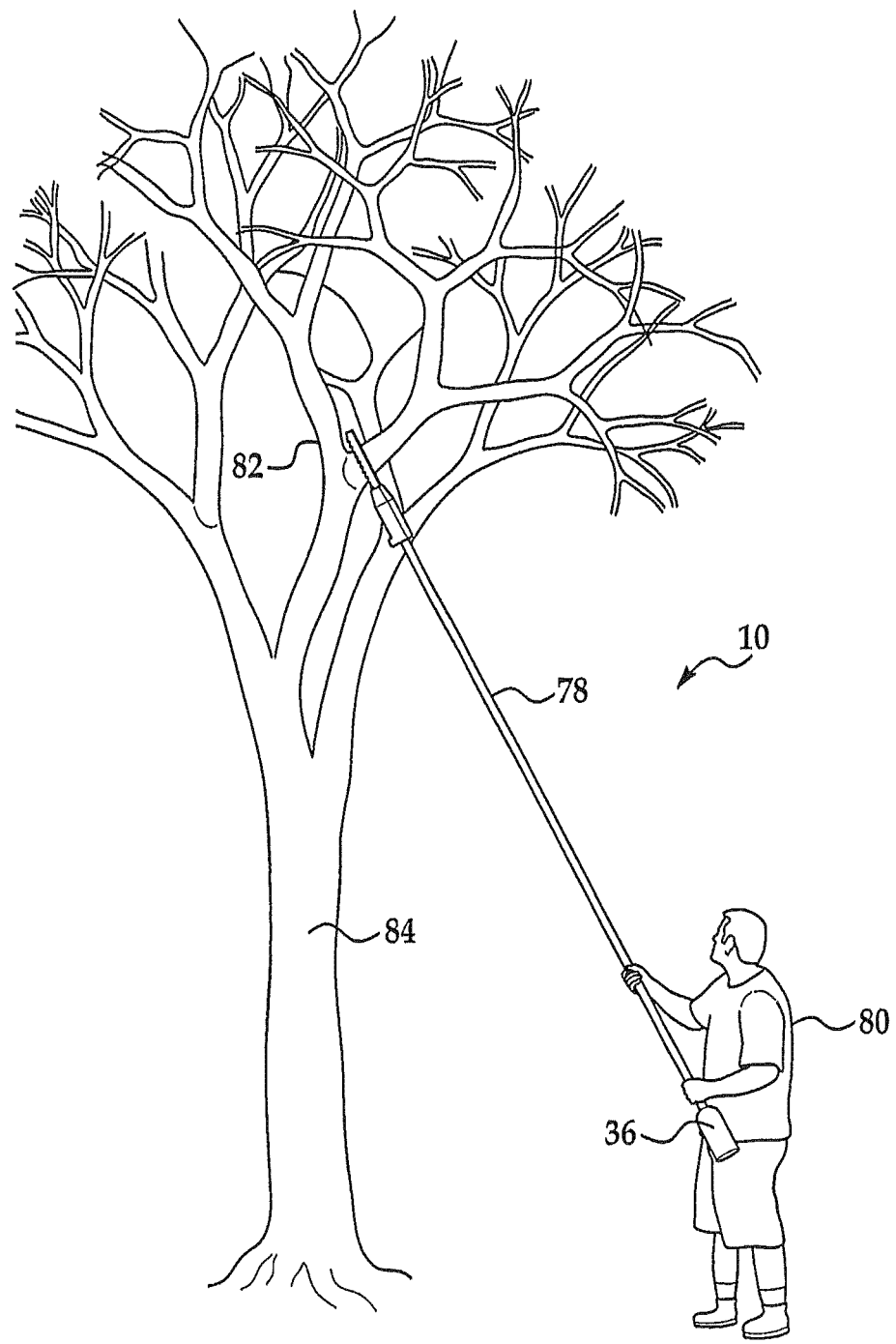
FIG. 1 is a view illustrating a pole saw.

Referring now to FIG. 1, a pneumatically powered pole saw 10 is illustrated. The pneumatically powered pole saw 10 has a cutting blade movably mounted thereto.

In order to cause the cutting blade to traverse back and forth between a first position (e.g., cutting blade fully extended away from a distal end of the head member) and a second position (e.g., cutting blade fully retracted into the distal end of the head member) a source of compressed gas 36 is in selective fluid communication with a chamber at either side of the piston to cause movement of the piston in the chamber, wherein movement of the piston causes movement of the cutting blade by moving the rod and the mount. It being understood that size of chambers vary accordingly with the movement of the piston. In one non-limiting exemplary embodiment, the source of compressed gas is self-contained reservoir of carbon dioxide. Of course, other suitable types of compressed gas are considered to be within the scope of exemplary embodiments of the present invention. In another exemplary embodiment, the source of compressed gas is provided by a reservoir fluidly coupled to a compressor, which may be a stand alone device or a wearable unit.

In order to provide fluid communication between the source of compressed gas and a chamber on one side of the piston, a first valve or first main valve is provided to allow selective fluid communication between the source of compress gas and chamber via a conduit. The first valve or first main valve is configured to allow fluid communication between the source of compressed gas and the chamber when the first valve or first main valve is in an open position. Alternatively, and when the first valve or first main valve is in a closed position the chamber is in fluid communication with atmosphere via for example a check valve or other equivalent device so that the gas in chamber may be released to allow the cutting blade to travel to the first position. This is also provided by the first valve and the conduit. Accordingly, and when the first valve or first main valve is closed, the chamber via the conduit and the first valve allow the fluid in chamber to be released into the atmosphere.

In order to provide fluid communication between the source of compressed gas and a chamber on the other side of the piston, a second valve or second main valve is provided to allow selective fluid communication between the source of compress gas and this chamber via a conduit. The second valve or second main valve is configured to allow fluid communication between the source of compressed gas and this chamber when the second valve or second main valve is in an open position. Alternatively and when the second valve is in a closed position, this chamber is in fluid communication with atmosphere via a check valve or other equivalent device so that the gas in this chamber may be released to allow the cutting blade to travel to the second position. This is also provided by the second valve and the conduit. Accordingly, and when the second valve is closed, this chamber via the conduit and the second valve or second main valve allows the fluid in this chamber to be released into the atmosphere.

In accordance with an exemplary embodiment of the present invention and in order to move the cutting blade to the first position the first valve or first main valve is closed (e.g., gas vented from one side of the chamber separated by the piston) and the second valve or second main valve is open (e.g., gas supplied from the source to the other side of the chamber separated by the piston). Similarly and in order to move the cutting blade to the second position the first valve or first main valve is open (e.g., gas supplied from source to the one side of the chamber) and the second valve or second main valve is closed (e.g., gas vented from the other side of the chamber).

Referring now to FIGS. 2A-9C non-limiting embodiments of the present invention are illustrated. In one embodiment, the main valves are moved by an intermediary device called a pilot valve, which delivers compressed gas to actuate the main valves. Utilizing pneumatic pilot valves to actuate pneumatic main valves instead of directly actuating by mechanical arms, rods levers or sliders is desirable in that pilot valve pneumatic actuation of the main valves does not leave the main valves in an undetermined state, that is, in a "dead zone" position wherein all motion stops. A dead band or dead zone is a place where the valves are changing fluid flow states. This valve transition is where valves can stall and reciprocating motion can stop. This dead zone transition problem is particularly noticeable at extremes of reciprocation speed. For example, at slow speed, where valve actuators are moving very slowly, the main valves can pass too slowly through this dead zone state wherein both main valves' ports are partially open and partially closed. Since there is not sufficient momentum of the mechanical main valve actuators during slow speed to move the valves quickly through this state the valves stop in the dead zone where compressed gas is applied equally to both sides of the piston cylinder, and the piston and valves are therefore not being driven either direction and thus they are stalled.

In this embodiment, the pneumatically powered pole design utilizes pilot valves that provide compressed gas to actuated main valves. The primary advantage in the use of compressed gas pilot valves in this embodiment is exceptionally reliable actuation of the main valves, especially given the wide variation of reciprocation speed and with no rotational mass or centrifugal force to assist in the valve transition dynamics. Pneumatic actuation eliminates the problem of dead zone failure.

At the end of travel of the piston, a pilot valve is actuated which provides compressed gas energy to a main valves assembly, forcing the main valves through the dead zone and into proper state positions because of the steady force applied by the compressed gas. The main valves do not bounce back from their limits of travel at high reciprocation speeds because the gas pressure provided by the pilot valve holds the main valve momentarily in position. Nor will the main valves stall in the dead zone at slow speeds because the compressed gas from the pilot valve continues to force the main valves into proper position until the main valves' state transition has been completed.

FIGS. 2A-8E illustrate an embodiment of a pneumatically actuated pole saw with pilot valve actuation of the main valves. FIGS. 2A and 2B illustrate an external assembly view and the physical relationships of various components including pole 124, blade 108, blade roller 109, limb stop 123, main valves assembly 128, pilot valve 118, pilot valve 119, compressed gas inlet 117, and compressed gas splitters 132.

The FIGS. provide top level and sectional views through which view internal components including pilot valve actuator 120, piston cylinder 100, piston 106, piston rod 121 and main valves assembly 128 can be viewed. The internal views show the piston pushing the blade outward from the pole and the end of travel of piston 106 in this blade push direction pilot valve actuator 120 makes contact with pilot compressed gas actuator 119 (FIG. 2E) and FIG. 3C illustrates the reciprocating piston 106 at the end of travel in the blade pull direction where pilot valve actuator 120 attached to piston rod 121 is in contact with pilot valve 118.

At least FIGS. 4A, 4B, 5A, 5B, illustrate details of the reciprocal functioning. As illustrated, the piston cylinder 100 is held securely to pole 124 by a mount 122 so that compressed gas energy supplied alternatively to each side of the piston 106 by main valves assembly 128 forces piston rod 121 attached to blade 108 through coupling 126 and clevis pin 107 to reciprocate thereby provide gas powered cutting motion to the blade.

Figure 5A:
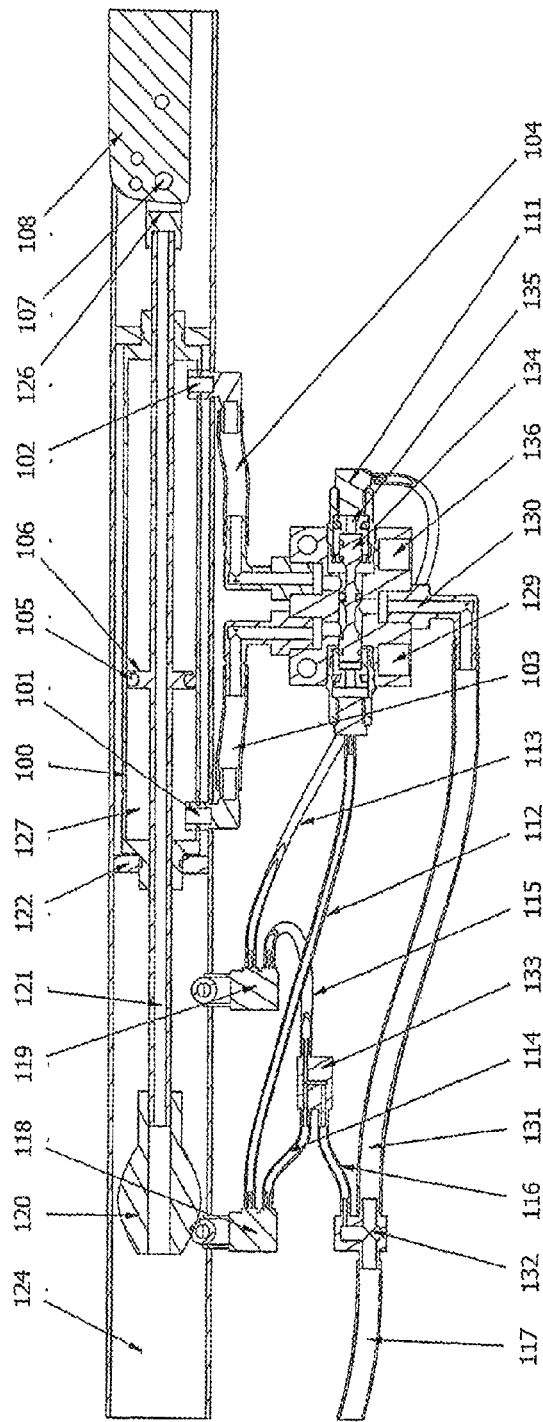
Figure 5B:
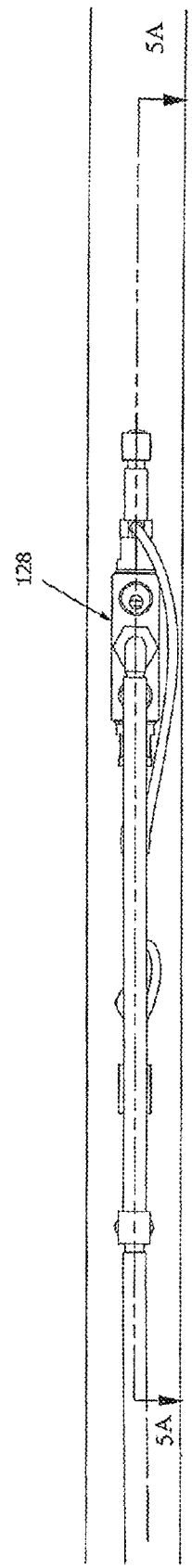

Referring at least to FIG. 4A, pneumatically actuated main valve 128 has an internal shuttle 135, which is compressed gas actuated, and reciprocates between two distinct locations by means of gas pressure applied to opposite ends of 135 through tubing from two small mechanically actuated pilot valves 118 and 119 positioned so they are alternatively actuated at the ends of travel of the main piston rod 121. The main valve 128, is seen from non-cutaway views of at least FIGS. 4B and 5B. FIGS. 4A and 5A show the main piston 106 in alternate positions in order to illustrate a full reciprocating cycle and the interaction of the pilot valves with the pneumatically actuated main valves of assembly 128.

FIG. 5A shows when compressed gas comes through the pole saw via tube 117. A portion of the gas then comes through primary gas flow splitter 132 to tube 116 into gas flow splitter 133 through tubes 114 and 115 to the mechanically actuated pilot valves 118 and 119 while most of the gas flow volume is conducted from primary flow splitter 132 through tube 131 and fitting 130 into the main 4-way valve 128. Compressed gas coming into main 4-way valve 128 is directed past the internal shuttle 135 and out of main valve 128 through tube 104 to inlet fitting 102 into the piston cylinder where it applies gas pressure to slideable piston 106. Gas pressure is kept from leaking around slideable piston 106 by means of piston seal 105. Compressed gas in the chamber on the opposing side of piston 106 is vented out of chamber 127 through fitting 101 into tube 103 and out of main valve 128 through vent orifice 129. Gas pressure in the piston chamber moves piston 106 attached to piston rod 121, which is linked to cutting blade 108 through blade attach rod and bracket 126 and 107, forces saw blade 108 to move in the pull direction.

After some travel in the pull direction the actuator 120 attached to the end of piston rod 121 opposite from the end where blade 108 is attached contacts pilot valve 118. Pilot valve 118 when contacted by mechanical actuator 120 directs a pulse of gas from splitter 133 through tube 114 then through pilot valve 118 into tube 112 and into main valve 128 which pulse of gas moves internal shuttle 135 located within main valve 128 such that the primary gas supply coming into main valve 128 through fitting 130 is redirected to tube 103 and fitting 101 into chamber area 127 of cylinder 100 and applies pressure against piston 106 forcing attached piston rod 121 to move saw blade 108 in the push direction and pilot valve actuator 120 attached to rod 121 to move in direction toward pilot valve 119. When gas pressure is increased in piston chamber 127 gas pressure on the opposite side of piston 106 and inside of cylinder 100 needs to be vented to reduce pressure that would oppose movement of piston 106 in the blade push direction, and the vent gas moves through fitting 102 into tube 104 though main valve assembly 128 and out into the atmosphere through vent orifice 136.

Referring now to at least FIG. 4A, when valve actuator 120 makes contact with pilot valve 119 a pulse of gas is conveyed from splitter 133 through tube 115 then through the opened valve 119 to tube 113 and on to connector 111 into main valve 128, which pulse of gas moves internal shuttle 135 such that the primary gas supply coming into valve 128 through fitting 130 is then directed to tube 104 and fitting 102 into the piston chamber providing pressure against piston 106 and forcing piston rod 121 connected through blade attach bracket 126 to blade 108 and causing saw blade 108 to return to a powered pull cutting stroke.

Accordingly and in this embodiment, pilot valves are used to gas actuate a main valves assembly to reciprocally drive a piston linked to the cutting blade of the pole saw.

Referring now to at least FIGS. 6-9C the functionality of the valves and the pistons and associated motion dynamics of various embodiments of alternative exemplary embodiments of the present invention are illustrated wherein detailed views illustrate the position of the piston and valves.

FIG. 6A shows a portion of the valving with the piston in mid travel and the pilot valves venting. FIG. 6E also shows the piston in mid-travel and the pilot valves venting and illustrates the valve assembly on the blade side of the piston cylinder.

Figure 7:
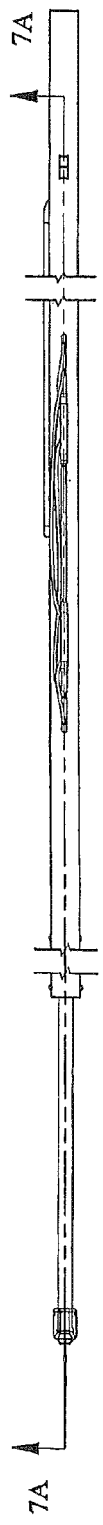
Figure 7A:
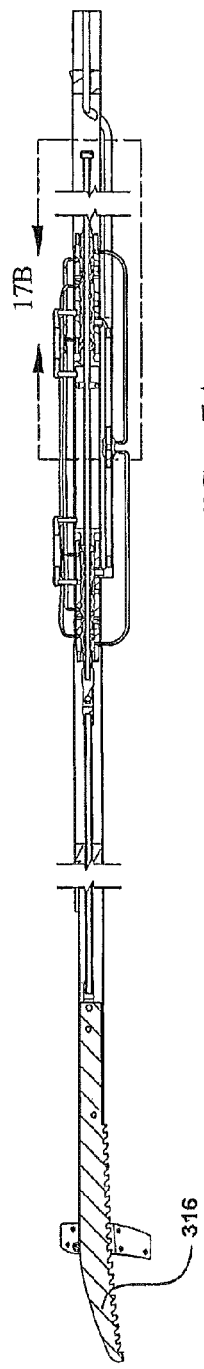
Figure 7B:
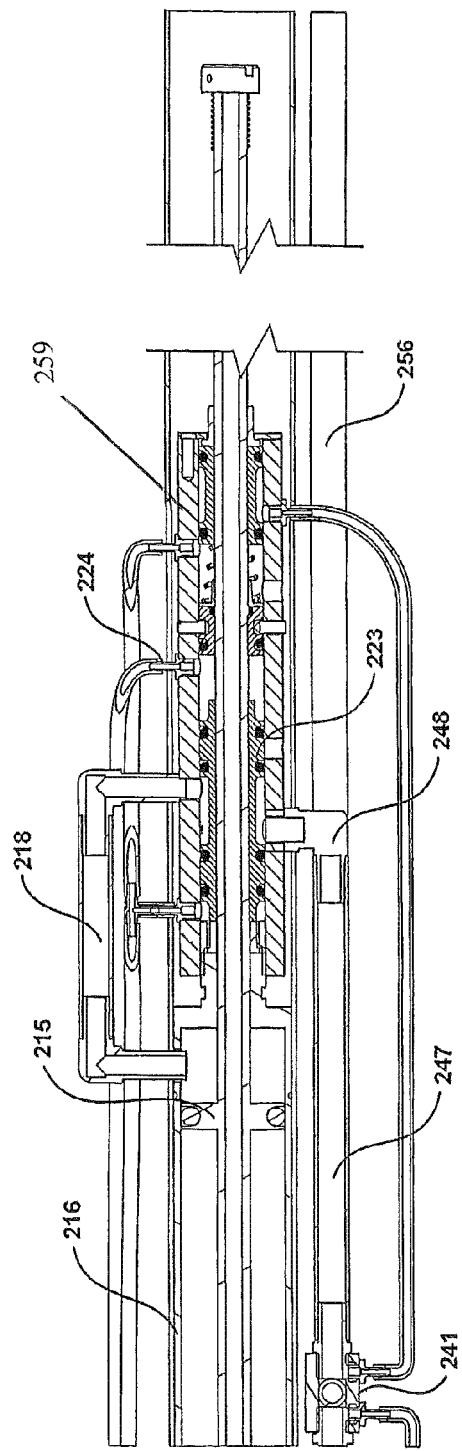

FIGS. 7B and 7E illustrate expanded views of the valve assemblies on opposite ends of the piston chamber. FIG. 7E illustrates that the piston is fully retracted in the blade pull stroke position and pilot valve 236 is shown as being actuated.

Figure 8:
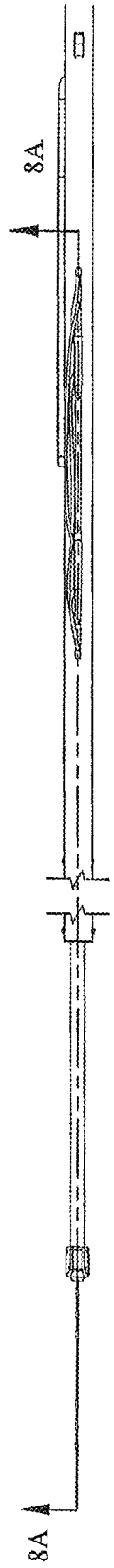
Figure 8A:
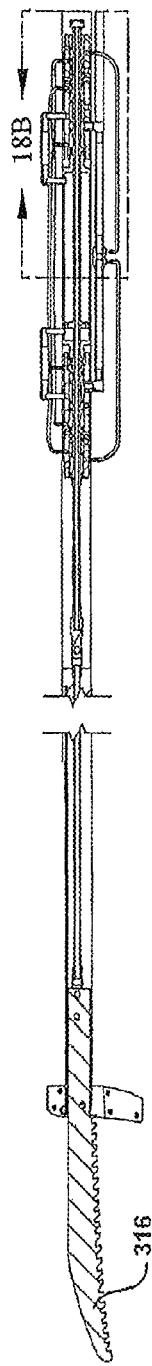
Figure 8B:
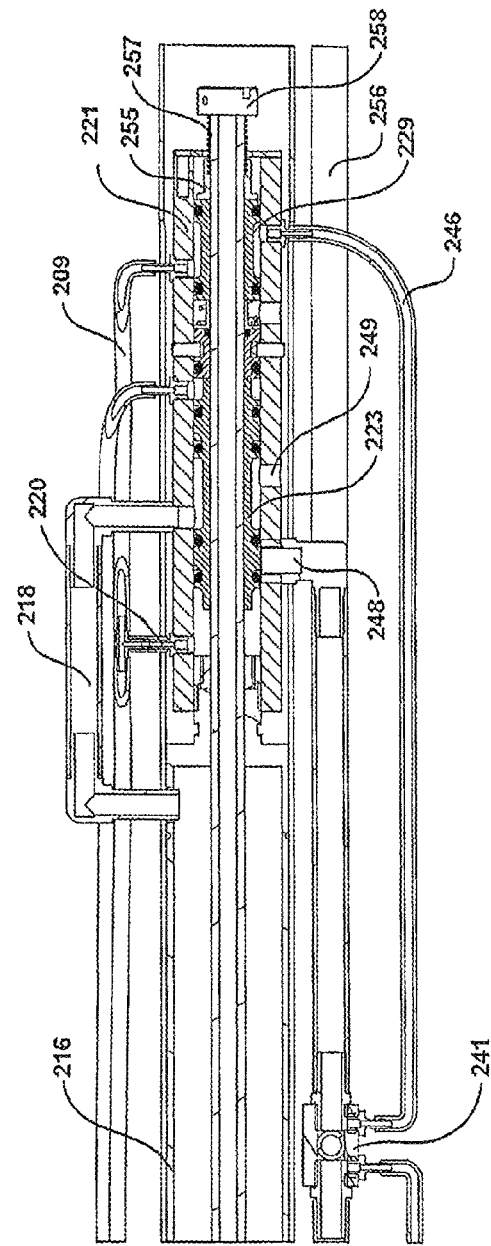

FIGS. 8B and 8E are similar views to FIGS. 7B and 7E however, the blade is in the fully extended position and pilot valve 229 is shown as being actuated.

Referring now to FIGS. 9-9C, ball bearings are illustrated as being attached to the blade. FIG. 9C shows details of the blade stop end with the pole bearing and blade in conjunction with a limb in order to describe limb cutting action by the blade.

In another embodiment, the piston cylinder and valves are shifted away from the blade though the use of a rod extension 303, and piston rod 202 (See at least FIG. 6A). Through the use of a light-weight rod extension 303 the weight of the piston and valve assemblies are moved away from the blade end of the pole. Repositioning the weight in this manner makes it easier for the operator to balance, align and position the pneumatic pole saw for cutting in a tree.

In accordance with one embodiment of the present invention, the piston cylinder 216 and related valve sub-assemblies 221 and 236 are repositioned away from the cutting blade 316 by inserting a light weight rod extension 303, between the piston rod 202 and the blade 316. This allows the weight of the piston cylinder 216 and valves closer to be repositioned closed to the person holding the other end of the pole, which is opposite from the blade end of the pole. Accordingly, the center of weight of the apparatus is shifted back from the blade end of the pole making it easier for the operator to hold, position, and balance the pole saw in operation. In an alternative embodiment, this shifting in weight could also be achieved by means of cable and pulley to couple reciprocating power between the actuator and blade.

In another embodiment of the present invention and as illustrated in at least FIGS. 6-6E the pilot valves 236 and 221 and associated main valves, 210 and 223 located on the same axis as the piston rod 202, thereby reducing the physical diameter of the pole saw so that the valves can be located within the pole saw housing and thus reduce the diameter and/or profile of the pole saw such that is can more easily reach between branches of a tree. As illustrated in the attached FIGS., the pilot valves 236 and 221 and associated main valves, 210 and 223 are positioned about or axially about the piston rod 202 extending from opposite sides of the piston 215. The pilot valves 236 and 221 and associated main valves, 210 and 223 are also configured such that the piston rod 202 can be slidably received within the pilot valves 236 and 221 and associated main valves, 210 and 223 such that reciprocal movement of the piston 215 and rod(s) 202 can be achieved. In addition, the pilot valves 236 and 221 and associated main valves, 210 and 223 are also sildably received within housings 259 and 271 threaded onto their respective ends of piston cylinder 216. Still further, the housings 259 and 271 and the piston cylinder 216 are received within the housing or pole of the pole saw.

In alternative embodiments, the pilot valves 236 and 221 and associated main valves, 210 and 223 can be located on the same side of the piston cylinder or adjacent to the piston cylinder.

The placing of these pilot and main valves on axis such that the piston rod goes through the center of the pilot and main valves allows the valves to be in close proximity to the piston cylinder while still being inside the pole. In contrast and as illustrated in FIGS. 2A-5B, the main valves assembly 128 is in close proximity to the piston cylinder to optimize power efficiency but because neither main valves assembly 128 nor associated pilot valves 118 and 119 are inside of the pole the overall saw dimensions in this portion of the pole saw are larger than those illustrated in FIGS. 6-8E.

Although FIGS. 6-9 and 9B illustrate external tubing, this is merely provided as a non-limiting embodiment to illustrate and describe the pneumatic gas flow in each of the tubes. It is, of course, understood that in one non-limiting exemplary embodiment, these tubes will be in intimately close proximity to the pole and/or internal to the housing of the pole.

As shown in FIGS. 6-8E, the main valves assembly have been separated into two valve subassemblies. In FIG. 2-5B the main valves assembly had the 4 way valves connected together so that if one moved to a new state the opposing one moved simultaneously. In FIGS. 6A-8E each main valve in the valve subassembly has a pilot valve nearby and both main and pilot valve are housed in the cylinders to form valve subassemblies 221 and 236. These valve subassemblies are threaded onto their respective ends of piston cylinder 216. Placing the valve subassemblies at opposite ends of the piston cylinder reduces the distance between the individual main valves and their respective piston cylinder gas inlets, improves power efficiency by reducing compressed gas losses during main valve switching. This improvement in power efficiency is due to close physical proximity and shorter coupling tubes.

Alternative embodiments of the pneumatic valve architecture in addition to those shown in the embodiments of the attached FIGS. These alternative embodiments would employ separate pilot valve or valves to actuate compressed gas driven main valves. One such alternative embodiment would be to place both main valves on the same end of the piston cylinder, still actuating by pilot valves on the same end or on opposite ends of the piston cylinder. Such valve architectures would vary in power efficient, in complexity of valve architecture, and in centers of weight.

As illustrated in at least, FIGS. 6A-6B, 6D and 6E each end of piston cylinder 216 has attached to it one of the two valve sub-assemblies 236 and 231. Each of these valve assemblies includes a pilot valve, a main valve, and associated conductive tubing. In one non-limiting exemplary embodiment, the valve subassemblies are attached by thread to the ends of the piston cylinder. On one end, the end closest to blade 316, is located valve sub-assembly 236 containing pilot valve 205 and main valve 210. On the other end of the piston cylinder valve sub-assembly 221 containing pilot valve 229 and main valve 223 is located.

As illustrated in at least FIGS. 8D and 8E piston 215 attached to piston rod 202, has finished moving in blade push direction whereby blade 316 is fully extended outward. A spring 257 (FIG. 8B) moved by piston rod end 258 has contacted bushing 255 and pushed it into pilot valve 229, which has released compressed gas which has flowed from inlet tube 256 into inlet gas manifold 241 to gas tube 246 through the now actuated pilot valve 229 into tube 209 to be conducted to fittings 220 of main valve 223 and also from fitting 220 to inlet fitting 253, (See FIG. 8E), and into the actuation side of the other main valve 210. Main valve 223 is forced by pilot gas pressure to move away from the piston cylinder 216 and moves into a position to block gas from inlet tube 256 through fitting 248 while main valve 223 simultaneously vents gas from the piston chamber through transfer tube 218 through main valve 223 and out vent 249. Pilot gas from valve 229 supplied as described through tube 209 has simultaneously passed through tube 209 to fitting 253 and into main valve 210 actuating 210 toward piston cylinder 216, main valve 210 thereby allowing compressed gas from inlet tube 256 through manifold 241 through tube 239 into now open main valve 210 into transfer tube 211 into the piston cylinder to apply gas pressure onto this side of the piston chamber and forcing the piston 215 with O-ring seal 240 to now transition to an opposite direction which will result in force being applied through piston rod 202 which is linked mechanically through rod extension 303 to the cutting blade 316 and which results in now pulling the cutting blade inward and toward the piston cylinder 216.

Referring to FIGS. 7-7E, as the piston continues in this blade pull direction spring 201 mounted on piston rod 202 will eventually contact bushing 203 forcing pilot valve 205 (FIG. 7E) to move toward valve stop 208, compressing pilot valve return spring 232 and repositioning pilot valve 205 such that compressed gas from manifold 241 through tube 234 into fitting 231 is conducted through now actuated pilot valve 205 to through fitting 206 into tube 207 simultaneously providing compressed gas to main valve 210 through fitting 212 and also into main valve 223 through fitting 224. Compressed gas from pilot valve 205 thereby forces main valve 210 to moves in a direction outward and away from piston cylinder 216, main valve 210 thus being forced into a new position which blocks compressed gas from manifold 241 through tube 239 from passing out of fitting 238. Main valve 210 does now allow compressed gas on the adjacent side of the piston cylinder to vent out through transfer tube 211 and through main valve 210 and out to atmosphere through vent 236.

While main valve 210 has been actuated to vent the adjacent side of piston chamber 216, main valve 223 has been simultaneously activated by pilot valve 205 through tube 207 to move in a direction which allows compressed gas from manifold 241 through tube 247 to fitting 248 through main valve 223 into transfer tube 218 to be conducted into the piston cylinder. Compressed gas flowing into the piston cylinder will force the piston 215 in a direction that allows for a push stroke of the piston rod linked to the cutting blade 316. When this push stroke of the piston reaches its limit of travel pilot valve 229 will again be actuated by spring 257 as shown in FIGS. 8-8E the reciprocation cycle will begin again to now repeat the pull stroke motion linked to the cutting blade 316 through connecting rod 303. The above has described a full cycle of reciprocating motion of the pilot valve controlled independently gas actuated main valve architecture of this embodiment of pneumatically powered pole saw.

Referring now to FIGS. 9-9C views and in some instances sectional views of a rectangular pole section 304 is provided. Of course, other configurations in addition to rectangular are contemplated. Section 304 is the portion of pole a rectangular aluminum extrusion within which the cutting blade is attached to rod extension 303 which in turn is mechanically linked to piston rod 202 to transfer reciprocating power from the actuating piston 216 to cutting blade 316 as shown in as least FIG. 6A. In one embodiment, there is a pin mounted roller bushing 312 mounted at the end of the pole 304 which, in combination with bearing sets 321 and 322, function to guide blade 316 while minimizing frictional resistance to the reciprocating motion of blade 316. Bushing 312 further constrains the directional force on blade 316, which occurs when blade 316 is cutting a limb 317 shown in FIG. 9C.

In one non-limiting embodiment, the bearing sets 321 and 322 each comprise two ball bearings, one located on each side of the blade 316, the individual bearings of each set are attached together by press pin and with bearing sets 321 and 322 located on the end of blade 316 which is in proximity to the coupling point of rod extension 303. Bearing sets 321 and 322 rolling inside of the rectangular section of pole 304 guide the blade while minimizing hardware complexity and weight needed in providing the blade guide function.

As illustrated in FIG. 9B a section of the pole has been cut away near pneumatic control switch 320 because the typical light weight pneumatically actuated pole saw will be five to eight meters in length. This length does not lend itself to detailed viewing of internal parts without visual removal of a section of the pole thus shortening its appearance in FIG. 9B. As illustrated in the attached FIGS. and by moving weight away from the blade end of the pole and towards the operator the pole saw is balanced to provide control and positioning of the pole saw as it is extended to cut a tree as illustrated in FIG. 6A by effectively extending piston rod 202 through use of light weight rod extension 303. This rod extension 303 results in the weight of the piston cylinder and associated valves being shifted down the pole toward the operator, making it easier for the operator to balance and align and position the pneumatic pole saw for cutting. The necessary extended connection between the piston rod and the blade can be achieved by other than a rod (e.g., cable and pulley or any other equivalent means). Yet another means would be the use of a single ended piston with a spring return on the blade and a spring return on the piston then only a cable would be required to transfer power between the piston and the blade, wherein the blade return spring would provide power for the push stroke of the blade.

In one non-limiting exemplary embodiment, a compressed gas switching pneumatic valve assembly is provided. The valve assembly comprising an outer pneumatic chamber, a slidably received gas sealed valve member within the pneumatic chamber, an internal void extending from one side of the pneumatic chamber to another side of the pneumatic chamber, the void allowing axial location of the pneumatic valve assembly around an axial located piston rod of a pneumatic piston chamber, the pneumatic valve assembly further comprising two or more gas conductive ports and conduits to conduct switchable gas fluid flow into and out of the pneumatic chamber when slidably received valve member is externally actuated to change position within the pneumatic chamber.

In another non-limiting embodiment, the pneumatic valve assembly is configured as a pilot valve, the pneumatic valve chamber being axially located and attachable on one end to a piston chamber, the internal pneumatically sealed slidable spring returned valve member is actuated to alternate gas flow position by end effector on axial piston rod such that motion of the slidable valve member switches compressed gas fluid flow through fluid conducting port and conduit from inward gas fluid flow to outward gas fluid flow and removal of piston rod mounted end effector from actuation of valve member allows spring return of the valve member whereby gas flow is switched from outward fluid flow to inward fluid flow direction.

Still further and in yet another embodiment, the valve assembly is configured as a main valve, the pneumatic valve chamber being axially located around the piston rod of a pneumatic piston chamber and which switches compressed gas flow to and from a piston chamber, the pneumatic valve being configured as a main pneumatic valve assembly with slidably received pneumatically sealed valve member being externally actuated by compressed gas to change positions by compressed gas fluid pressure on one sealed chamber end of the valve member, compressed gas fluid flow being directed to switch gas flows to alternate position of the valve member through fluid conducting ports and conduits from inward flowing to outward flowing and when gas fluid pressure is removed from one sealed chamber end of the valve member and gas fluid pressure is applied to an opposite sealed chamber end of the valve member compressed gas fluid flow is directed to switch gas flows by alternating position of the valve member through fluid conducting port and conduit from outward flowing to inward flowing.

In still yet another embodiment, the compressed gas switching pneumatic valve assembly is comprised of both a pilot valve and a main valve gas fluid flow through the conduit from the fluid outlet of the pilot valve is used to actuate the compressed gas actuated main valve.

In accordance with exemplary embodiments of the present invention, a fluid valve is disclosed. In an exemplary embodiment, the fluid valve is coupled to a common piston cylinder 1' and is configured to control a flow of compressed gas in a manner similar to a pneumatic switch when operated.

Figure 10:
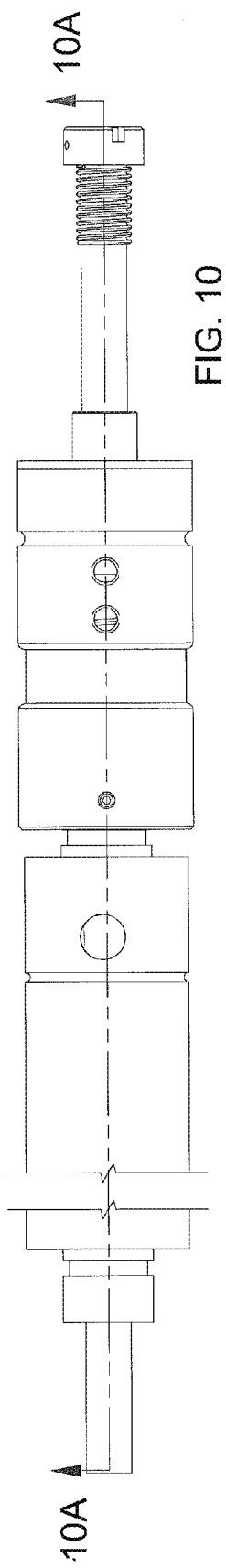
FIG. 10 is a view of a pilot valve assembly coupled to a common piston cylinder according to another embodiment of the present invention in a first state.
Figure 10A:
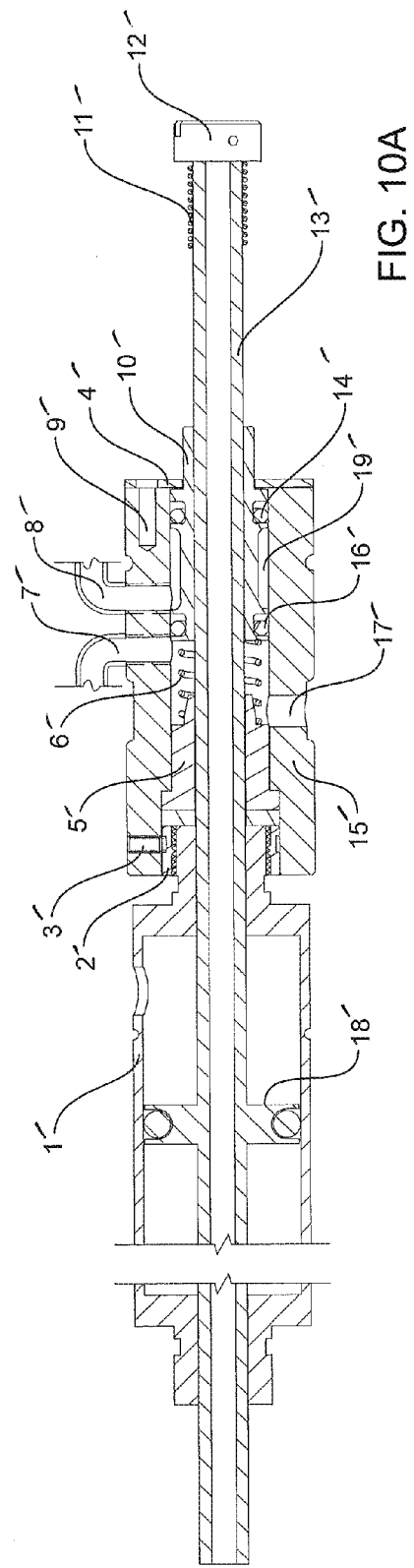
FIG. 10A is a cross-sectional view of a pilot valve assembly coupled to a common piston cylinder, the pilot valve being in a first state according to an embodiment of the invention.

Referring now to FIGS. 10 and 10A, the illustrated fluid valve assembly 15' is shown axially located and attached to piston cylinder 1' by a plurality of threads 2' and a set screw 3'. In one embodiment, the fluid valve assembly 15' functions as a pilot valve and the piston cylinder 1' is a portion of a pole saw as described in U.S. patent application Ser. No. 13/448,340 (U.S. 2012/0240418) incorporated herein by reference. Accordingly, one non-limiting use of the fluid valve assembly 15' would be with a pneumatically powered pole saw as described herein or as in U.S. Patent Publication No. 2012/0240418 and/or U.S. Pat. No. 8,156,655.

A pneumatic piston rod 13' slidably extends through the valve assembly 15' and is connected adjacent a first end to a piston 18' arranged within the chamber of the piston cylinder 1'. An end effector nut 12' and a biasing mechanism 11', such as a spring for example, are mounted to the free end (e.g. opposite the piston 18') of the pneumatic piston rod 13'. The biasing mechanism 11' may be configured to dampen the impact of contact between the end effector 12' and a portion of the valve assembly 15'.

The valve assembly 15' includes a valve shuttle 10' that is slidable relative to an internal void within the cylinder of fluid valve assembly 15'. As a result of the contour of the valve shuttle 10', an internal chamber 19' is formed by the space between the surface of the valve shuttle 10' and an internal surface of the valve assembly 15'. The internal chamber 19' is fluidly coupled to a fluid inlet port 8' of the fluid valve assembly 15'. Shuttle sealing members 14', 16', such as O-rings or an elastomeric diaphragm for example, are positioned adjacent the opposing ends of the valve shuttle 10' and are configured to seal any compressed gas within the internal chamber 19', thereby inhibiting gas flow beyond the chamber 19'. Also, arranged within the valve assembly 15', in contact with an end of the pilot valve shuttle 10', is a biasing mechanism 6', such as a compression spring for example, mounted to a spring holder 5'. When the fluid valve assembly 15' is in a first, non-operational state, as illustrated in FIG. 10A, the biasing force of the biasing mechanism 6' applies a force to the slidable valve shuttle 10' such that the shuttle 10' is located in a first position, adjacent an end plate 4' connected to the valve assembly 15' with one or more fasteners 9'. When in the first position, a portion of the valve shuttle 10' extends beyond the end plate 4' and the valve assembly 15'.

Figure 11:
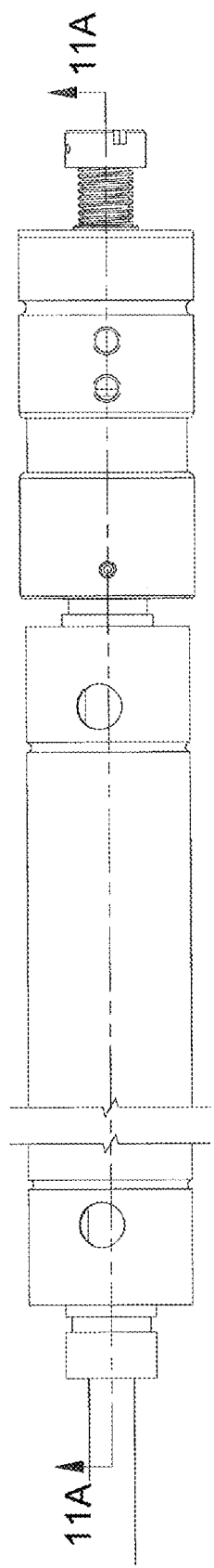
FIG. 11 is a view of the pilot valve assembly of FIG. 10 in a second state.
Figure 11A:
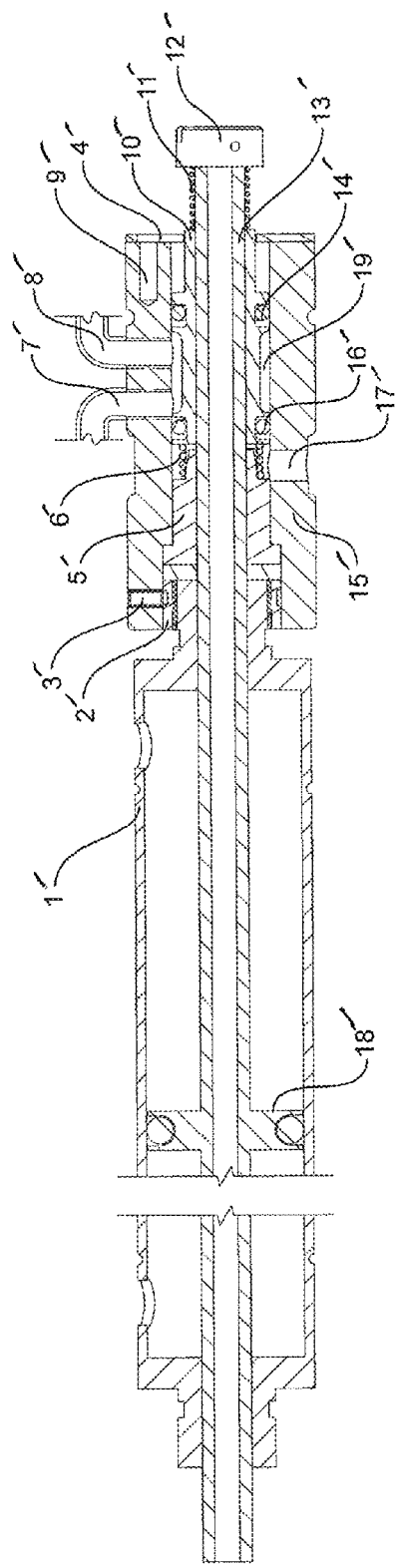
FIG. 11A is a cross-sectional view of a pilot valve assembly coupled to a common piston cylinder, the pilot valve being in a second state according to an embodiment of the invention.

Referring now to FIGS. 11 and 11A, the valve assembly 15' is illustrated in a second, operational state. In an operational state, the valve shuttle 10' is in a second position, generally spaced away from the end plate 4', as shown in FIG. 11A. The movement of the valve shuttle 10' to the second position causes the biasing mechanism 6' to at least partially compress against the spring holder 5'. In addition, the biasing mechanism 11' surrounding the pneumatic piston rod 13' is in contact with the end of the valve shuttle 10'. The fluid valve assembly 15' includes an exit port 7' positioned adjacent the inlet port 8'. When the valve assembly 15' is in a second, operational state, the shuttle 10' is positioned such that the internal chamber 19' is fluidly coupled to both the inlet port 8' and the exit port 7'. As a result of the flow path generated through the chamber 19' of the valve shuttle 10', the valve assembly 15' operates as a pneumatic switch.

The fluid valve assembly 15' is transformed from a non-operational state to an operational state by the motion of the piston 18' and the piston rod 13' within the piston cylinder 1'. The gas flow and associated motion dynamics of a piston 18' within piston cylinder 1' are known to a person having ordinary skill in the art. In one embodiment, the cylinder of the fluid valve assembly 15' includes a vent hole 17' that allows any compressed gas from the motion of the valve shuttle 10' between the first position and the second position to escape without creating a backpressure that would inhibit movement of the shuttle 10'.

The valve assembly 15' is configured to transition between the non-operation and operational states illustrated in the FIGS. When the pneumatic piston rod 13' is moved generally away from the fluid valve assembly 15', the biasing force applied by biasing mechanism 11' on the shuttle 10' is removed. In turn, by releasing the force applied to the shuttle 10', the internal biasing mechanism 6' will bias the valve shuttle 10' back to the first position adjacent the end plate 4'. When the valve shuttle 10' returns to the first position, the sealing members 14' and 16' mounted on the valve shuttle 10' are repositioned to again inhibit compressed gas from flowing to exit port 7'.

The valve assembly 15' typically actuates at the end of travel of the piston rod 13' when it has moved inwardly toward the piston body. In embodiments where it is desirable to actuate the valve assembly 15' prior to the end of inward travel of the piston rod 13', a spacer or spring, such as biasing mechanism 11' for example, is located around a portion of the piston rod 13' to actuate the valve assembly 15'. Inclusion of a spacer or biasing mechanism 11' reduces the distance traveled before the actuating force supplied by piston rod 13' and end effector 12' contacts shuttle 10', and therefore reduces the travel distance required to transform the valve assembly 15' from a non-operational to an operational state.

The valve assembly 15' described herein is a fluid control valve that can function as a fluid switch. The valve assembly 15' utilizes the structural features of a common piston cylinder to support and to actuate the valve, thereby eliminating or substantially reducing the use of additional mounting and actuating hardware. In the exemplary embodiment, the valve assembly 15' is integrally mounted to a piston cylinder 1' and is actuated by the piston rod 13' thereof. In addition, the physical relationship between piston cylinder 1' and valve assembly 15' substantially reduces the cost and complexity and alignment problems associated with prior art valves, which utilize additional hardware to separately mount and separately align valves. Another advantage is that the valve assembly 15' may be mounted on either or both ends of a dual ended piston cylinder 1', thereby providing gas switching flow signals at either or both ends, that is, any end of the piston cylinder 1' where the piston rod 13' protrudes.

What is claimed is:

1. A pneumatically powered pole saw, comprising:
    a fluid valve assembly having a generally hollow cylinder coupled to an axially aligned piston chamber of the pole saw, the cylinder defining an internal void extending from one side of the cylinder to another side of the cylinder, wherein the cylinder includes at least one fluid inlet path and at least one fluid outlet path;
    a shuttle arranged within the internal void of the cylinder, the shuttle being slidable between a first position and a second position around an axially located piston rod of the piston chamber, wherein a sealed chamber exists between a portion of the shuttle and the cylinder and when the shuttle is in the second position, the chamber is fluidly coupled to the fluid inlet path and the fluid outlet path to provide a controllable fluid flow into and out of the cylinder;
    a blade operatively coupled to the piston rod; and
    wherein the cylinder is coupled the piston chamber by a threaded engagement between the cylinder and the piston chamber.

2. The pneumatically powered pole saw of claim 1, wherein the fluid configured to flow into and out of the cylinder is compressed gas.

3. The pneumatically powered pole saw of claim 1, wherein the valve functions as a pilot valve to actuate a larger fluid flow control valve.

4. The pneumatically powered pole saw according to claim 1, wherein axial movement of the piston rod moves the shuttle between the first position and the second position.

5. The pneumatically powered pole saw according to claim 1, further comprising:
    a first biasing mechanism and a spring holder positioned adjacent the shuttle within the internal void, wherein when the shuttle is in the second position, the first biasing mechanism is at least partially compressed between the spring holder and the shuttle.

6. The pneumatically powered pole saw according to claim 1, further comprising at least one o-ring configured to seal the chamber.

7. The pneumatically powered pole saw according to claim 1, further comprising at least one elastomeric diaphragm configured to seal the chamber.

8. The pneumatically powered pole saw according to claim 1, wherein the piston rod includes a biasing member adjacent a free end, the biasing member being in contact with the shuttle and applying a force thereto when the shuttle is in the second position.

9. The pneumatically powered pole saw according to claim 1, wherein the cylinder includes a vent hole configured to reduce backpressure within the cylinder.

10. The pneumatically powered pole saw as in claim 1, wherein the piston rod of the piston chamber extends completely through the cylinder.

11. The pneumatically powered pole saw according to claim 10, wherein axial movement of the piston rod moves the shuttle between the first position and the second position.

12. A pneumatically powered pole saw, comprising:
    a pilot valve assembly for actuating the pneumatically powered pole saw, the pilot valve assembly having a generally hollow cylinder coupled and axially aligned with a piston chamber of the pole saw, the piston chamber having a piston movably received therein and the piston is coupled to a piston rod which moves as the piston is moved within the piston chamber, wherein the piston is operatively coupled to a blade of the pole saw and wherein the generally hollow cylinder defines an internal void that extends from one side of the cylinder to another side of the cylinder, wherein the cylinder includes at least one fluid inlet path and at least one fluid outlet path; and
    wherein the pilot valve assembly further comprises a shuttle arranged within the internal void of the cylinder, the shuttle being slidable between a first position and a second position around the piston rod, wherein the piston rod is axially aligned with and extends completely through the cylinder, wherein a sealed chamber exists between a portion of the shuttle and the cylinder and when the shuttle is in the second position, the chamber is fluidly coupled to the fluid inlet path and the fluid outlet path to provide a controllable fluid flow into and out of the cylinder.

13. A method of operating a pneumatically powered pole saw, comprising:
    axially aligning a pilot valve assembly with a piston chamber of the pole saw, the piston chamber having a piston movably received therein and the piston is coupled to a piston rod which moves as the piston is moved within the piston chamber, wherein the piston rod is operatively coupled to a blade of the pole saw and wherein the pilot valve assembly has a generally hollow cylinder coupled to and axially aligned with piston chamber, wherein the generally hollow cylinder defines an internal void that extends from one side of the cylinder to another side of the cylinder, wherein the cylinder includes at least one fluid inlet path and at least one fluid outlet path; and wherein the pilot valve assembly further comprises a shuttle arranged within the internal void of the cylinder, the shuttle being slidable between a first position and a second position around the piston rod, wherein the piston rod is axially aligned with and extends completely through the cylinder, and wherein a sealed chamber exists between a portion of the shuttle and the cylinder and when the shuttle is in the second position, the chamber is fluidly coupled to the fluid inlet path and the fluid outlet path to provide a controllable fluid flow into and out of the cylinder.

14. The method as in claim 13, wherein axial movement of the piston rod moves the shuttle between the first position and the second position.

* * * * *